Oct. 16, 1956  N. FODOR ET AL  2,766,962

FUEL METERING VALVE ASSEMBLY

Filed Jan. 7, 1953

INVENTORS.
Nicholas Fodor,
BY Alexander Dreisin,

Cromwell, Greist & Warden.
ATTYS.

United States Patent Office 2,766,962
Patented Oct. 16, 1956

2,766,962

FUEL METERING VALVE ASSEMBLY

Nicholas Fodor, Wilmette, and Alexander Dreisin, Highland Park, Ill., assignors, by mesne assignments, to Micromatic Hone Corporation, Detroit, Mich., a corporation of Michigan Application January 7, 1953, Serial No. 330,044

9 Claims. (Cl. 251—310)

This invention relates to valve structures and is particularly concerned with improvements in a valve assembly for controlling the flow of a fluid by varying the size of the flow area.

In valve structures of the general type comprising a hollow valve body having inlet and outlet passageways and a rotatable shaft having communicating passageways which are movable upon rotation of the shaft into and out of communication with the inlet and outlet passageways in the body to control the passage of fluid therethrough, it is desirable to keep the force required to rotate the shaft at a minimum. This is frequently difficult because of the effect of the forces which are normally set up between the valve shaft and the valve body by passage of the fluid. These forces generally result in substantial binding between the shaft and the body, particularly where the fluid to be controlled is at pressures substantially above atmospheric and the fit between the valve body and the valve shaft must be close to maintain leakage within acceptable values.

It is a general object of the invention to provide a valve assembly of the rotatable shaft type in which distortion between the valve body and the valve shaft due to pressure and movement of the fluid to be controlled is eliminated and internal friction between the valve shaft and the valve body is held to a minimum thereby providing for easy operation of the valve shaft without the application of an undesirable amount of force.

It is another object of the invention to provide an hydraulic or pneumatic mechanism for controlling the flow of a fluid by varying the flow area wherein a valve body cooperating with a control shaft and carrying one part of the flow controlling passage is suspended elastically within a housing containing inlet and outlet openings.

It is a further object of the invention to provide a flow controlling apparatus of the type described wherein the valve body is suspended within a housing by means of O rings of resilient material, one of the rings being compressed axially and being free to deform radially and another of the rings being compressed radially and being free to deform axially relative to the axis of the control shaft.

Figure 1:
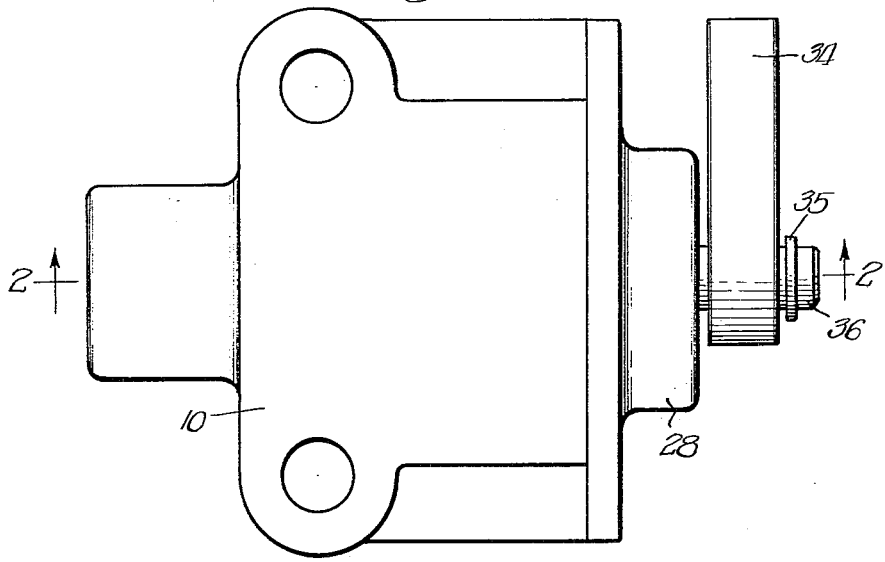
Figure 2:
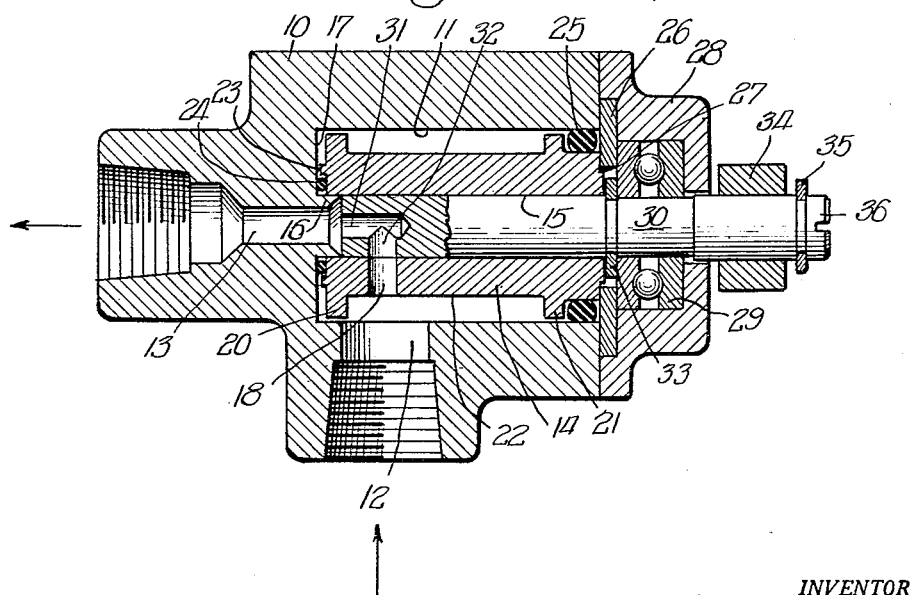

These and other objects of the invention will be apparent from a consideration of the valve assembly which is shown by way of illustration in the accompanying drawings wherein:

Fig. 1 is a plan view of a valve assembly embodying the principal features of the invention, and Fig. 2 is a section taken generally on the line 2—2 of Fig. 1.

The illustrated valve mechanism is particularly adapted for use in controlling the flow of a liquid or gaseous fuel but it may be used wherever it is desired to vary the flow of any fluid substance, provided, of course, that it is constructed of materials which are not affected by the particular substance with which it is designed to be used.

The valve comprises an external member or housing 10 which is provided with any conventional means for mounting the same on a support or the like. The housing 10 has an internal cavity or bore 11 of substantial diameter which extends from one end of the housing and terminates short of the other end. The casing 10 is provided with a radially extending passageway 12 communicating with the interior bore 11 which forms an inlet opening for entry of the fuel to be metered. An axial passageway 13 extends from the end of the cavity or bore 11 to the end of the casing 10 which forms an outlet opening for discharge of the metered fuel.

A valve body 14 which is of somewhat less exterior diameter than the interior diameter of the bore 11 is received in the bore. The valve body 14 is provided with an axial bore 15 extending its full length which receives at its inner end an annular flange formation 16 which projects inwardly of the end wall 17 of the cavity 11 and which has a relatively close sliding fit in the end of the bore 15. The flange formation 16 surrounds the inner end of the outlet opening or passageway 13 and connects the same with the bore 15. A radial opening or aperture 18 in the side wall of the valve body 14 extends from the bore 15 to the outer periphery of the valve body 14. The major portion of the outer periphery of the valve body 14 is of substantially less diameter than the diameter of the cavity 11, whereby to place the opening 18 in communication with the inlet 12 regardless of the position of the valve body. At its inner end the valve body 14 is provided with a radially extending peripheral end flange or shoulder 20, and a similar radially extending peripheral flange 21 is provided at the other end of the valve body 14 and spaced inwardly of the end thereof. Both flanges 20 and 21 are of a diameter slightly less than the diameter of the cavity or bore 11 in the casing 10, with the valve body portion 22 between the flanges 20 and 21 of reduced diameter.

The inner end face of the valve body 14 is provided with an axially projecting annular shoulder or flange 23 which forms a retainer for a relatively small O ring 24. The ring 24 is of resilient material, such as rubber, or the like, which is initially placed under axial compression but is free to expand radially. At its outer end the valve body 14 is supported in the cavity 11 by a relatively large O ring 25 of rubber or the like which is positioned in encompassing relation to the end of the valve body 14 and retained against substantial axial movement in one direction by the peripheral flange 21. The ring 25 is of such a size that it is compressed radially while being free to expand axially within limits determined by the axial position of flange 21 and a washer 26 at the adjacent end of the valve body 14.

The valve body 14 is retained in the cavtiy 11 by means of the washer 26, which engages the outer end of valve body 14 outwardly of a small shoulder formation 27. The washer 26 is held against the end of the casing 11 by means of a bearing retainer 28 which completes the casing and is arranged to be fastened, by any conventional means, such as bolts, or screws, against the end face of the casing. The retainer 28 has a recess therein for receiving a thrust bearing 29 which supports a valve shaft 30.

The valve shaft 30 extends into the bore 15 of the valve body 14 and is received in close fitting rotatable relation therein. At its inner end the shaft 30 is provided with an axial opening 31 which communicates with the outlet passage 13 and also with a connecting radial opening 32 which is axially aligned with the radial opening 18 in the valve body 14 so that it may register to any desired degree with the opening 18 upon rotation of the control shaft 30. The shaft 30 is retained in proper axial position by a snap ring 33 which engages with the thrust bearing 29. Shaft 30 is provided with an operating lever or handle 34 which is secured on the end portion of the shaft by a press fit or any other conventional securing means and is retained against axial removal therefrom by a washer 35 and a cap screw 36.

In operation, the casing 10 is secured to a suitable fixed support and the inlet and outlet passageways 12 and 13 are connected into the line in which the fuel is carried, at the desired control point. The valve may be opened or closed as much as desired by engaging the operating handle 34 and turning the valve shaft 30. The resilient floating mounting, provided by O rings 24 and 25, between the valve body 14 and the external casing 10 cushions the relative movement between the valve body 14 and casing 10, which the pressure in the fluid tends to cause, when the valve shaft 30 is manipulated to change the flow area and prevents distortion between the valve body 14 and its control shaft 30. By relieving the strain between the valve body and its control shaft the force necessary to rotate the shaft can be held to a minimum and undue wear between these members can be eliminated.

While specific details of construction are described in the illustrated form of the device it will be understood that variations and modifications thereof may be resorted to within the spirit of the invention.

We claim:

1. A valve metering mechanism comprising a housing having an internal bore and inlet and outlet passageways, a valve body of substantially rigid material and of lesser diameter than the diameter of said bore, resilient means for supporting said valve body at opposite ends in the bore of said housing, said valve body having an internal bore and passageways communicating with said inlet and outlet passageways, and a valve shaft rotatable in the bore of said valve body and having a passageway movable by rotation of said shaft in said valve body into communicating relation with said passageways in said valve body.

2. A valve assembly comprising a casing having a cylindrical cavity, radial and axial extending inlet and outlet passageways communicating with said cavity, a hollow valve body of substantially rigid material having an external diameter less than the internal diameter of said cavity, resilient means supporting said valve body in said cavity with the external surfaces thereof in spaced relation to the internal surfaces of said cavity, said valve body having passages connecting with the inlet and outlet passages, respectively, and a valve shaft rotatably mounted in said hollow valve body, said valve shaft having communicating passages adapted to be aligned with said passages in said valve body upon predetermined rotation of said shaft.

3. A fluid metering device comprising an external casing having an axial bore terminating short of one end of said casing, an inlet passage in a side wall of said casing and an outlet passage in the end wall of said casing, said inlet and outlet passages extending to and connecting with said axial bore, a valve body of less diameter than the internal diameter of the bore in said casing, said valve body having an axial bore and a radially extending passageway connecting therewith, said valve body being positioned in the bore of said casing with one end of the axial bore of said valve body communicating with the outlet passage and with said radial passageway connecting the inlet passage with said axial bore of said valve body, resilient means between said valve body and said casing permitting limited movement of said valve body relative to said casing and a valve shaft rotatably positioned in the bore of said valve body, said valve shaft having an axially and radially extending passageway in the inner end thereof adapted to connect the inlet and outlet passageways upon predetermined rotation of said valve shaft.

4. A fluid metering device comprising an external casing having an axial bore terminating short of one end of said casing, an inlet passageway in a side wall of said casing and an outlet passageway in the end wall of said casing, said inlet and outlet passageways extending to said axial bore, a valve body having an axial bore and a radial passageway communicating therewith, said valve body being positioned in the bore of said casing with one end of the axial bore of said valve body communicating with the outlet passageway and with the radial passageway connecting the inlet passage with the axial bore of said valve body, the external walls of said valve body being spaced from the internal walls of said casing, a resilient element in the space between the inner end of said valve body and the end wall of said casing permitting limited axial movement thereof, a resilient element in the space between the other end of said valve body and the casing side wall, and a valve shaft rotatably positioned in the bore of said valve body, said valve shaft having an axially and radially extending passageway in the inner end thereof adapted to connect the inlet and outlet passageways upon predetermined rotation of said valve shaft.

5. A valve assembly comprising a casing having a cylindrical cavity extending inwardly of one end thereof and terminating short of the other end thereof, said casing having radial and axial extending inlet and outlet passages at the inner end of said cavity, a hollow valve body of lesser diameter than the diameter of said cavity, a ring member of resilient material between the inner end of said valve body and the inner end wall of the casing defining said cavity permitting cushioned axial movement of said valve body in said cavity, a ring member of resilient material between the other end of said valve body and the inner cavity defining wall of said casing permitting cushioned radial movement of said valve body in said cavity, said valve body having passages communicating with said inlet and outlet passages, respectively, and a valve shaft rotatably mounted in said hollow valve body, said valve shaft having communicating passages adapted to be aligned with said inlet and outlet passages upon predetermined rotation of said shaft.

6. A fluid metering device comprising an external casing having an axial bore of substantial diameter extending inwardly of one end of said casing and terminating short of the other end thereof, said casing having a passageway connecting with the inner end of said bore and forming an outlet passage, said casing having a second passageway connecting with said axial bore and forming an inlet passage, a valve body in said axial bore, said valve body having an axial bore and a communicating passageway connecting with said outlet and inlet passages, respectively, said valve body being of less diameter than the axial bore in said casing, means including resilient elements in the space between said valve body and the inner end wall and side walls of said casing which define the axial bore therein, said means resiliently supporting said valve body in floating relation in said axial bore and permitting limited radial and axial movement of said valve body relative to said casing, and a valve shaft rotatably positioned in the bore of said valve body, said valve shaft having communicating passageways therein adapted to connect the inlet and outlet passages upon predetermined rotation of said valve shaft.

7. A fluid metering device comprising an external casing having an axial bore of substantial diameter extending inwardly of one end of said casing and terminating short of the other end thereof, said casing having a passageway connecting with the inner end of said bore and forming an outlet passage, said casing having a second passageway connecting with said axial bore and forming an inlet passage, a valve body in said axial bore, said valve body being of less diameter than said bore and having a portion intermediate the ends of reduced diameter, said valve body having an axial bore and a communicating passageway in the portion of reduced diameter which connect with the outlet and inlet passages of said external casing, respectively, resilient ring elements between the inner end of said valve body and the inner end wall of said casing and between the other end of said valve body and the side walls of said casing which define the axial bore therein, said ring elements permitting limited radial and axial movement of said valve body relative to said casing whereby said valve body is floatingly supported in said external casing, and a valve shaft rotatably positioned in the bore of said valve body, said valve shaft having communicating passageways therein adapted to connect the inlet and outlet passages upon predetermined rotation of said valve shaft.

8. A valve metering mechanism comprising a housing having an internal bore and inlet and outlet passageways, a valve body having an external diameter which is less than the diameter of said bore, said valve body having a radially extending peripheral shoulder spaced from one end thereof and forming a peripheral recess, said valve body having an axially projecting annular shoulder at its other end forming an end recess, and compressible ring members of resilient material in said recesses whereby said valve body is floatingly supported in said housing, said valve body having an internal bore and means forming a passageway connecting said inlet and outlet passageways, a valve shaft rotatably mounted in the bore of said valve body, said valve shaft being movable by rotation of said shaft to open and close the passageway connecting said inlet and outlet passageways thereby to open and close said valve mechanism.

9. A valve metering mechanism comprising a housing having an internal bore and inlet and outlet passageways, a valve body having an external diameter which is less than the diameter of the internal bore of said housing, said valve body having a peripheral recess at one end thereof and a ring member of resilient material in said peripheral recess, said valve body having an axially extending recess in the other end thereof and a ring member of resilient material in said axially extending recess whereby to support said valve body in the bore of said housing for resilient movement transversely and axially thereof, said valve body having an internal bore and passageways communicating with the inlet and outlet passageways in said housing, and a valve shaft rotatable in the bore of said valve body, said valve shaft having a passageway which is movable into communicating relation with said passageways in said valve body by rotation of said shaft in said valve body.

References Cited in the file of this patent

UNITED STATES PATENTS

| | | |
|---|---|---|
| 868,143 | Strong | Oct. 15, 1907 |
| 1,800,243 | Birks | Apr. 14, 1931 |
| 2,223,636 | Mullen | Dec. 3, 1940 |